United States Patent
Yeo

(10) Patent No.: US 6,277,051 B1
(45) Date of Patent: Aug. 21, 2001

(54) METHOD FOR CONTROLLING MANUAL DOWNSHIFTING IN AN AUTOMATIC TRANSMISSION

(75) Inventor: Chang-Gi Yeo, Kyungki-do (KR)

(73) Assignee: Hyundai Motor Co., Seoul (KR)

( * ) Notice: Subject to any disclaimer, the term of this patent is extended or adjusted under 35 U.S.C. 154(b) by 0 days.

(21) Appl. No.: 09/458,030

(22) Filed: Dec. 10, 1999

(30) Foreign Application Priority Data

May 10, 1999 (KR) .................................................. 99-16542

(51) Int. Cl.$^7$ .................................................. F16H 61/04
(52) U.S. Cl. .................................................. 477/149
(58) Field of Search .................................. 477/122, 149, 477/141, 144; 701/52, 60

(56) References Cited

U.S. PATENT DOCUMENTS

| | | | |
|---|---|---|---|
| 5,046,174 | * 9/1991 | Lentz et al. | 477/144 X |
| 5,070,747 | * 12/1991 | Lentz et al. | 477/144 X |
| 5,513,104 | * 4/1996 | Tsutsui et al. | 701/60 |
| 5,769,754 | * 6/1998 | Kil | 477/149 X |
| 5,865,707 | * 2/1999 | Shimada et al. | 701/60 |
| 6,068,576 | * 5/2000 | Tsutsui et al. | 477/144 |

* cited by examiner

Primary Examiner—Charles A. Marmor
Assistant Examiner—Ankur Parekh

(57) ABSTRACT

A power-on manual downshift control method including the steps of determining if a power-on manual downshifting is being performed or not when a TCU receives a power-on manual downshifting signal, producing a duty control signal of 0% if power-on manual downshifting is being performed, determining if a shift begin point is detected or not, compensating for a feedback start duty ratio and producing a compensated duty ratio Dr if the shift begin point is detected, maintaining the state for a predetermined period of time Ta, executing a feedback control sub-routine on ending of the predetermined period of time Ta, reducing the duty ratio Dr by as much as a predetermined duty amount Δd on ending the feedback subroutine and maintaining this state for 8 ms, and ending the duty control if the duty ratio Dr reaches 0%.

2 Claims, 8 Drawing Sheets

METHOD FOR CONTROLLING MANUAL DOWNSHIFTING IN AN AUTOMATIC TRANSMISSION

BACKGROUND OF THE INVENTION (a) Field of the Invention

The present invention relates to a method for controlling an automatic transmission and, more particularly, to a method for controlling manual downshifting in an automatic transmission which allows a driver to downshift the automatic transmission by manipulating a shift lever without experiencing shift shock.

(b) Description of the Related Art

Automatic transmissions are typically equipped with a transmission control unit (TCU) for automatically shifting the transmission in response to sensed operating parameters such as vehicle speed. The TCU controls a plurality of clutches and brakes by selectively applying or releasing hydraulic pressure to effect changes in a drive mode in accordance with driver manipulation of a shift lever, in addition to realizing different speeds in a drive D range.

FIG. 1 shows a hydraulic circuit diagram of a hydraulic control system in the conventional automatic transmission. In FIG. 1, reference numeral C1 denotes a second brake, C2 an under-drive clutch, C3 an over-drive clutch, C4 a reduction brake, C5 a direct clutch, C6 a reverse clutch, and C7 a low reverse brake.

Reference numeral 100 in FIG. 1 denotes a manual valve (M/V), 21 a low reverse solenoid valve (L/R-S/V), 31 a second solenoid valve (2ND-SNV), 41 an under-drive solenoid valve (U/D-S/V), 51 an over-drive solenoid valve (O/D-S/V), and 61 a reduction solenoid valve (RED-S/V).

Reference numeral 22 denotes a low reverse pressure control valve (L/R-PCV), 32 a second pressure control valve ($2^{ND}$-PCV), 42 an underclutch pressure control valve (U/D-PCV), 52 an overdrive pressure control valve (O/D-PCV), 62 a reduction brake pressure control valve (RED-PCV), 71 a fail-safe valve-A (FSV-A), 72 a fail-safe valve-B (FSV-B), 73 a fail-safe valve-C (FSV-C), and 81 an exhaust check valve (EX-V).

FIG. 2 is a block diagram showing a typical power-on manual downshift control system of the automatic transmission. As shown in FIG. 2, the power-on manual downshift control system for automatic transmissions includes a driving state detector 10 for detecting parameters indicative of the driving state of the vehicle from various sensors, the driving state detector 10 producing and outputting electrical signals corresponding to the driving state of the vehicle; a TCU 20 which receives the electrical signals from the driving state detector 10 and responsively produces duty control signals for manual downshifting on the basis of the electrical signals; and an actuator 30 controlling the transmission gear ratio in accordance with the duty control signals from the TCU 20 by applying and releasing line pressures to and from various lines of the hydraulic control system.

The driving state detector 10 includes an output rpm sensor 11 for sensing rpm of an output shaft and responsively producing a corresponding electrical signal; a throttle opening sensor 12 for sensing a throttle opening degree and responsively producing a corresponding electrical signal; a shift lever sensor 13 for sensing a position of a shift lever, which is manipulated by the driver, and responsively producing a corresponding electrical signal; an engine rpm sensor 14 for sensing engine rpm and responsively producing a corresponding electrical signal; an accelerator pedal sensor 15 for sensing an amount of displacement of an accelerator pedal and responsively producing a corresponding electrical signal; and an air intake sensor 16 for sensing an amount of air entering the engine and responsively producing a corresponding electrical signal.

The actuator 30 includes the L/R-S/V 21, $2^{ND}$-S/V 31, U/D-S/V 41, O/D-S/V 51, and RED-S/V 61.

A conventional power-on manual downshift control method in an automatic transmission provided with the above power-on manual downshift control system will be described hereinafter. For ease of description, only one manual downshift operation, i.e. a 5→4 power-on manual downshift operation, will be described with reference to FIGS. 6a, 6b, 6c, 6d, and 7.

The power-on manual downshift operation is performed when a sports mode, manual downshift mode, or power state mode, in each of which engine output is maximized, is activated at a shift begin (SB) point. The SB point is calculated on the basis of engine torque which is a function of vehicle speed.

With reference to FIG. 1, the second brake C1, overdrive clutch C3, and reverse clutch C6 are the operating friction elements for a fifth speed in the drive D range, while the underdrive clutch C2, overdrive clutch C3, and reverse clutch C6 act as operating elements in a fourth speed in the drive D range of the automatic transmission.

In the automatic transmission provided with the power-on manual downshift control system as described above, if the driver manipulates the shift lever in order to manually select the fourth speed of the drive D range, the TCU 20 receives a downshift signal from the shift lever sensor 13 of the driving state detector 10, and responsively produces a duty control signal. The actuator 30 receives the transmission control signal from the TCU 20 and responsively controls the transmission gear ratio to disengage the fifth speed and engage the fourth speed.

If the downshift signal is received, the TCU 20 transmits a duty control signal having a duty ratio of 0% to the 2ND-SV 31, which acts as the actuator 30, to release hydraulic pressure acting on the second brake C1. The transmission of this duty control signal by the TCU 20 is continued until the shift begin (SB) point is detected by engine rpm sensor 14.

The SB point is detected when a present turbine rpm (Nt(n)) is greater than a previous turbine rpm (Nt(n−1)). That is, if the duty ratio is changed from 100% to 0%, the engine torque increases such that the SB point is detected.

If the SB point is detected, the TCU 20 sends a duty control signal of a predetermined duty ratio (Dr) to the 2ND-SV 31, which acts as the actuator 30, so that feedback control for gradually releasing the line pressure applied to the second brake C1 is performed. This operation is continued until all the line pressure acting on the second brake C1 has been released, thereby completing manual downshift control.

While the feedback control is being performed, if it is detected that line pressure is being applied to the second brake C1 the TCU 20 sends another duty control signal to the U/D-S/V 41 such that line pressure is applied to the underdrive clutch C2.

The duty ratio (Dr) for releasing the line pressure applied to the second brake C1 is calculated using equation 1 as follows:

$$Dr = (Dr_0 + Dr_1 - Drkd) \times Ke + \Delta Dt, \qquad \text{<Equation 1>}$$

where
   Dr is a feedback start duty ratio,
   $Dr_0$ is an initial standard duty ratio (fixed value stored in memory),
   $Dr_1$ is a learned compensating rate,
   Ke is an engine rpm calibration factor,
   ΔDt is an oil temperature compensating duty ratio, and
   Drkd is an amount by which a ratio between intake air to engine rpm is less than a preset standard value.

However, in the conventional power-on manual shift control process, the manual shift is usually performed when the throttle valve opening (Th) is over 50% such that the initial standard duty ratio ($Dr_0$) for calculating the feedback start duty ratio (Dr) is set at a high input torque. Accordingly, in the case where the manual shift control is performed when the throttle opening (Th) is 20%–30%, the feedback control is performed at the same duty ratio (Dr) where the throttle valve opening is over 50%, even though the input torque is low.

In this case, since the manual shift control is performed using a high level of hydraulic pressure as when the input torque is high, shift shock occurs, as shown in FIG. 7, at the end of the manual shift operation such that shift quality is deteriorated.

SUMMARY OF THE INVENTION

The present invention has been made in an effort to solve the above problems of the prior art.

It is an object of the present invention to provide a manual downshift method capable of releasing line pressure at the end of the manual shift operation without generating shift shock by calculating and using a feedback start duty ratio (Dr) that is appropriate to a throttle valve opening. To achieve the above object, the manual downshift method of the present invention comprises the steps of determining if a power-on manual downshifting is being performed or not when a TCU receives a power-on manual downshifting signal, producing a duty control signal of 0% if power-on manual downshifting is being performed, determining if a shift begin point is detected or not, compensating for a feedback start duty ratio and producing a compensated duty ratio (Dr) if the shift begin point is detected, maintaining the state for a predetermined period of time Ta, executing a feedback control sub-routine on ending the predetermined period of time Ta, reducing the duty ratio Dr by as much as a predetermined duty amount Δd on ending the feedback sub-routine and maintaining this state for 8 ms, and ending the duty control if the duty ratio Dr reaches 0%.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 3A:
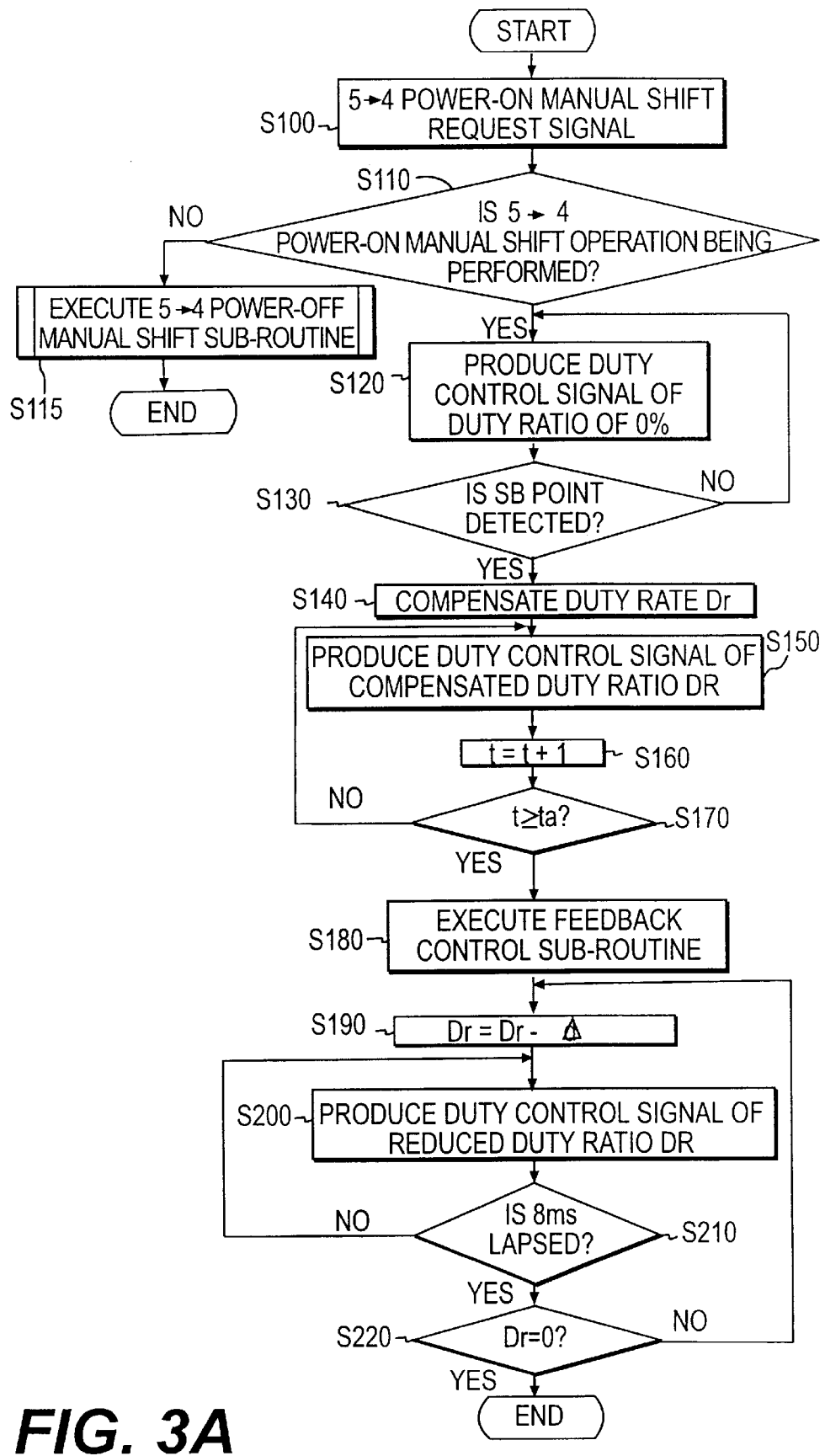
FIG. 3a is a flowchart of a manual downshift method according to a preferred embodiment of the present invention.

A preferred embodiment of the present invention will be described hereinafter with reference to the accompanying drawings. For ease of description, only one manual downshift operation, i.e. a 5→4 power-on manual downshift operation, will be described. It is to be assumed that manual downshift operations into other speeds are performed similarly to the operation described hereinbelow. FIG. 3a is a flowchart of a manual downshift method according to a preferred embodiment of the present invention.

As shown in FIG. 3a, in the method for controlling power-on manual downshifting in an automatic transmission, first, a 5→4 power-on manual downshifting signal is received by a TCU in step S100. Next, it is determined if a 5→4 power-on manual downshifting operation is being performed or not in step S110. If it is determined in step S110 that a 5→4 power-on manual downshifting operation is not being performed, a 5→4 power-off manual downshifting sub-routine is performed in step S115.

If it is determined in step S110 that a 5→4 power-on manual downshifting operation is being performed, a duty control signal of 0% is generated in step S120. After this step, it is determined if a shift begin point is detected or not in step S130. At this point, if the shift begin point is not detected, the process is returned to the previous step of step S120.

If the shift begin point is detected in step S130, compensation of a feedback start duty ratio (Dr) is performed in step S140. Next, in step S150, a corresponding duty control signal is generated. Subsequently, the duty control signal is produced and output for a predetermined period of time (Ta)

in step S160. Next, it is determined if the predetermined period of time (Ta) has elapsed in step S170, with the process returning to step S150 if the time (Ta) has not elapsed.

Figure 4:
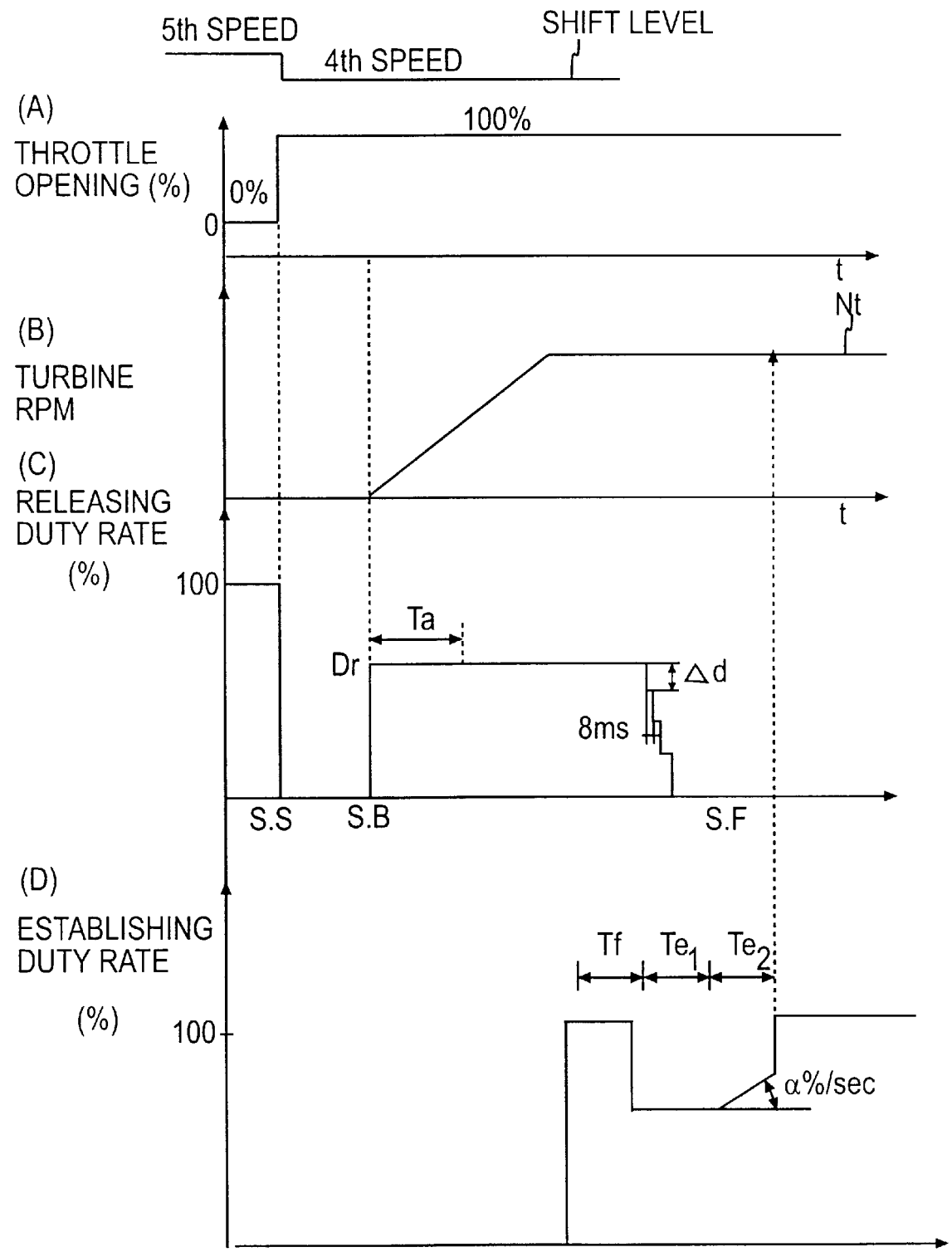
FIG. 4a is a graph showing variations in throttle opening during a manual shift operation according to the preferred embodiment of the present invention.
FIG. 4b is a graph showing variations in turbine rpm during the manual shift operation according to the preferred embodiment of the present invention.
FIG. 4c is a graph showing variations in a duty ratio while hydraulic pressure is exhausted during the manual shift operation according to the preferred embodiment of the present invention.
FIG. 4d is a graph showing variations in a duty ratio while hydraulic pressure is supplied during the manual shift operation according to the preferred embodiment of the present invention.

However, in step S170, if it is determined that the predetermined period of time (Ta) has elapsed, a feedback control subroutine is performed in step S180. Subsequently, the duty ratio (Dr) is reduced by a predetermined amount Δd after the feedback control subroutine is run in step S190. Following this step, a corresponding duty control signal is generated and output in step S200. It is then determined if a time of output of the duty control signal has exceeded 8 ms in step S210. if it is determined that 8 ms has not elapsed, step S200 is continued, while if it determined that 8 ms has elapsed, it is then determined if the duty ratio (Dr) has reached 0% in step S220. At this time, the process is ended if the duty ratio (Dr) has reached 0%, while the process is returned to step S190 if the duty ratio has not reached 0%.The method of controlling power-on manual downshifting according to the present invention will now be described in greater detail with reference to FIG. 4. Since it is the method that differs from the prior art, reference will also be made to FIGS. 1 and 2, with names of elements appearing in these drawings being identical to those used when describing the prior art.

First, referring to FIG. 4a, if a position of a shift lever is changed from a fifth speed to a fourth speed, and a throttle opening (Th) is changed from 0% to 100% by depression of an accelerator pedal while the vehicle is running in the fifth speed, a driving state detector 10 detects corresponding changes in the driving state of the vehicle and responsively produces a 5→4 power-on manual downshift signal (step S100). Next, a TCU 20 receives the 5→4 power-on manual downshift signal and determines if a present output rpm and a present throttle valve opening are in a state corresponding to a 5→4 downshift operation on the basis of parameters sensed by an output rpm sensor 11 and a throttle opening sensor 12 (step S110). Here, if the output rpm and throttle valve opening are not in a state corresponding to a 5→4 downshift, the TCU 20 executes a power-off manual downshift sub-routine in step S115.

If the output rpm and throttle valve opening are in a state corresponding to a 5→4 downshift operation, the TCU 20 sends a duty control signal of 0% (see FIG. 4c) to a $2^{ND}$-S/V 31 (operating as an actuator 30), for exhausting line pressure applied to a second brake C1 (step S120). The TCU 20 then determines if engine rpm have reached a shift begin (SB) point on the basis of parameters detected by an engine rpm sensor 14 (step S130).

The $2^{ND}$-S/V 31 of the actuator 30 is duty controlled according to the duty control signal from the TCU 20 such that the line pressure applied to the second brake C1 is discharged through an EX-V 31 via a FSV-B 72 and a $2^{ND}$-PCV 32. At this time, the line pressure is discharged at a rate shown by a first pressure exhaust line a1 in FIG. 5.

The SB point is determined by comparing a present turbine rpm (Nt(n)) and a previous turbine rpm (Nt(n−1)). That is, with reference to FIG. 4b, if a value of the present turbine rpm (Nt(n)) is greater than that of the previous turbine rpm (Nt(n−1)), the point at which the increase begins is the SB point. The TCU 20 detects the SB point.

$$Nt(n) > Nt(n-1)$$

If it is determined that engine rpm has reached the SB point, the TCU 20 executes a duty rate compensation operation to obtain a feedback start duty ratio (Dr) by adding a manual downshift compensation value (Drmnl) using equation 2 below (step S140).

$$Dr = (Dr_0 + Dr_1 - Drkd - Drmnl) \times Ke + \Delta Dt \qquad \text{<Equation 2>}$$

where

Dr is a feedback start duty ratio, $Dr_0$ is an initial standard duty ratio (fixed value stored in memory), $Dr_1$ is a learned compensating rate, Ke is an engine rpm calibration factor, ΔDt is an oil temperature compensating duty ratio, Drkd is an amount by which a ratio between intake air to engine rpm is less than a preset standard value, and Drmnl is a manual downshift compensating value according to variations in throttle valve opening.

The manual downshift compensating value (Drmnl) is preset in accordance with throttle valve opening as shown in Table 1 below.

TABLE 1

| A/N < 55% | Drmnl 1 |
|---|---|
| 55% ≦ A/N < 60% | Drmnl 2 |
| 60% ≦ A/N < 65% | Drmnl 3 |
| 65% ≦ A/N < 70% | Drmnl 4 |

A/N: air amount/engine torque measured at SB point

Next, the TCU 20 produces a duty control signal based on the feedback start duty ratio (Dr) calculated above and sends the signal to the $2^{ND}$-S/V 31 which acts as the actuator 30 (step S150). This state is maintained by the TCU 20 for a predetermined time period (Ta) (step S160).

Following the above, the TCU 20 determined if the predetermined time period (Ta) has elapsed (step S170). If it is determined that the time period (Ta) has elapsed, the TCU 20 executes a feedback control sub-routine (step S170), and sends a release duty control signal to the $2^{ND}$-S/V 31 to release line pressure applied to the second brake C1 (step S180).

Figure 3B:
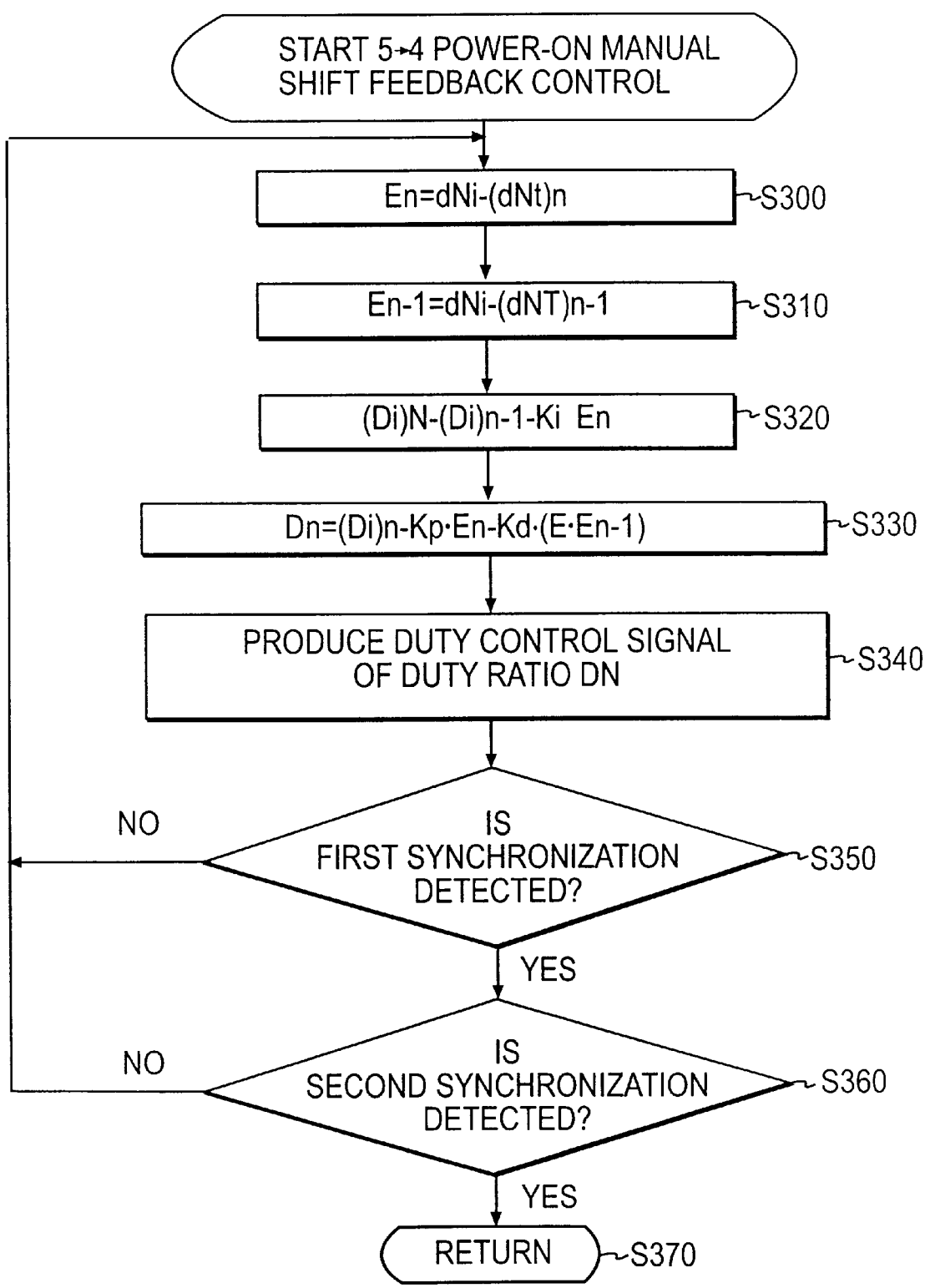
FIG. 3b is a flowchart of a subroutine of the method according to the preferred embodiment of the present invention.

FIG. 3b shows a flowchart of the feedback control sub-routine.

Once the feed back control subroutine is executed, a variation rate of present turbine rpm is calculated in step S300 on the basis of equation 3 below.

$$En^- = {}^-dNi^- - {}^-(dNt)n \qquad \text{<Equation 3>}$$

where

En is a variation rate of present turbine rpm, dNi is desired turbine rpm, and (dNt)n is actual turbine rpm.

Subsequently, the TCU 20 calculates a variation rate of previous turbine rpm (En−1) and duty ratio (Di) in steps S310 and S320 on the basis of equation 4 and equation 5, respectively, below.

$$En-1^{18} = {}^-dNi^- - {}^-(dNt)n-1 \qquad \text{<Equation 4>}$$

where

En−1 is a variation rate of previous turbine rpm, dNi is desired turbine rpm, and (dNt)n is actual real turbine rpm.

$$(Di)n = (Di)n-1 - Ki \times En \qquad \text{<Equation 5>}$$

where
- (Di)n is a duty ratio,
- (Di)n−1 is a previous duty rate,
- Ki is an integrating factor, and
- En is a variation rate of present turbine rpm calculated in equation 3.

The TCU 20 calculates a duty ratio (Dn) on the basis of equation 6 below by substituting the values calculated in equations 3, 4, and 5 in step S330, and responsively produces and sends a feedback control signal for feedback control to the $2^{ND}$-S/V 31 in step S340.

$$Dn = (Di)n - Kp \times En - Kd \times (En - En - 1) \qquad \text{<Equation 6>}$$

where
- Dn is a feedback control duty ratio,
- (Di)n is a duty ratio calculated in equation 5,
- Kp is a proportional gain,
- En is a variation rate of present turbine rpm calculated in equation 3,
- Kd is a differential gain, and
- En−1 is a variation rate of previous turbine rpm calculated in equation 4.

The $2^{ND}$-S/V 31 is duty controlled according to the duty control signal from the TCU 20 such that the line pressure applied to the second brake C1 is discharged out of the EX-V 81 via the FSV-B 72 and the 2ND-PCV 32. At this time, the line pressure is discharged at a rate shown by a second pressure exhaust line a2 in FIG. 5.

Figure 5:
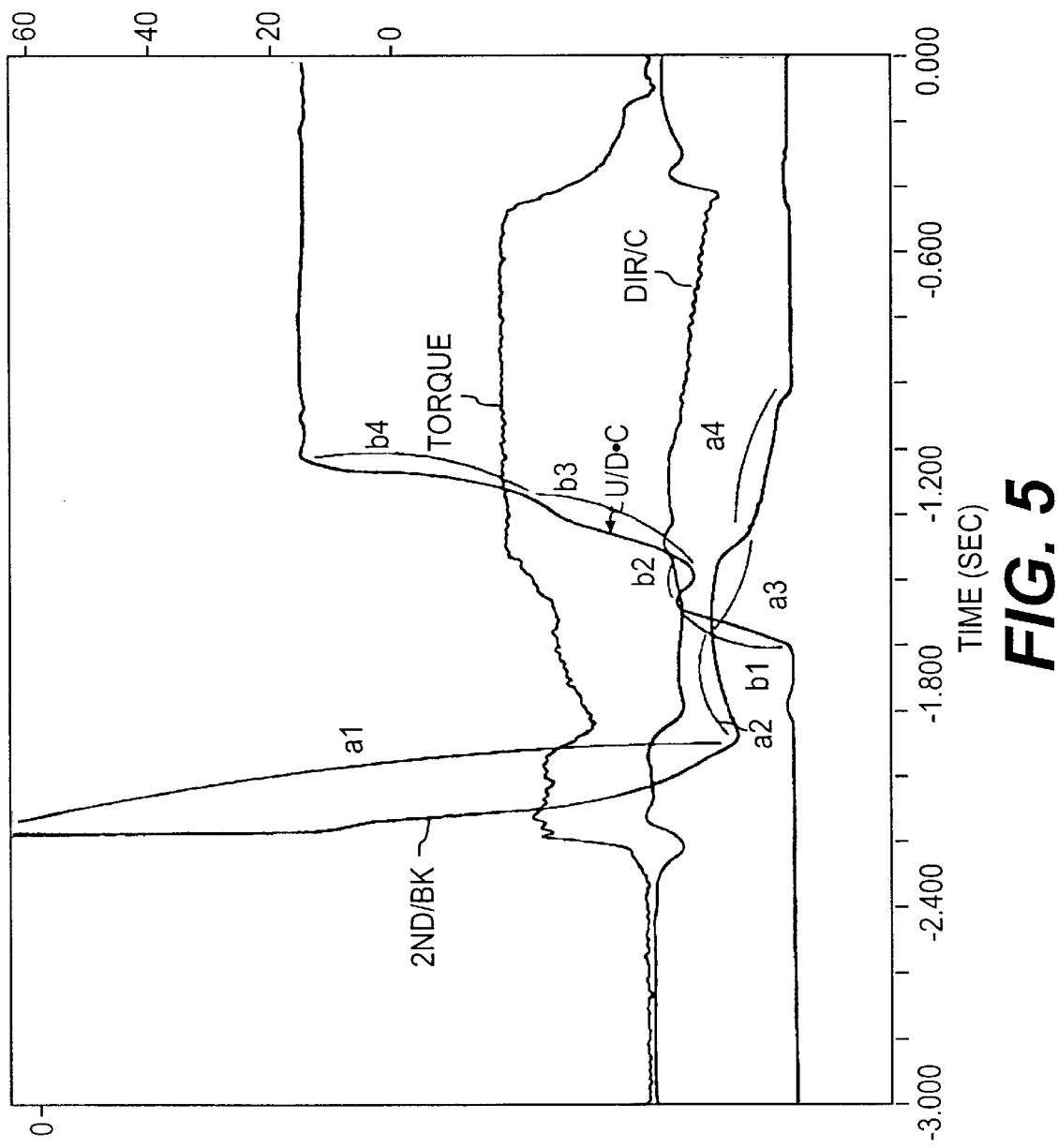
FIG. 5 is a graph showing variations in hydraulic pressures applied to friction elements during the manual downshift operation according to the preferred embodiment of the present invention.
Figure 6:
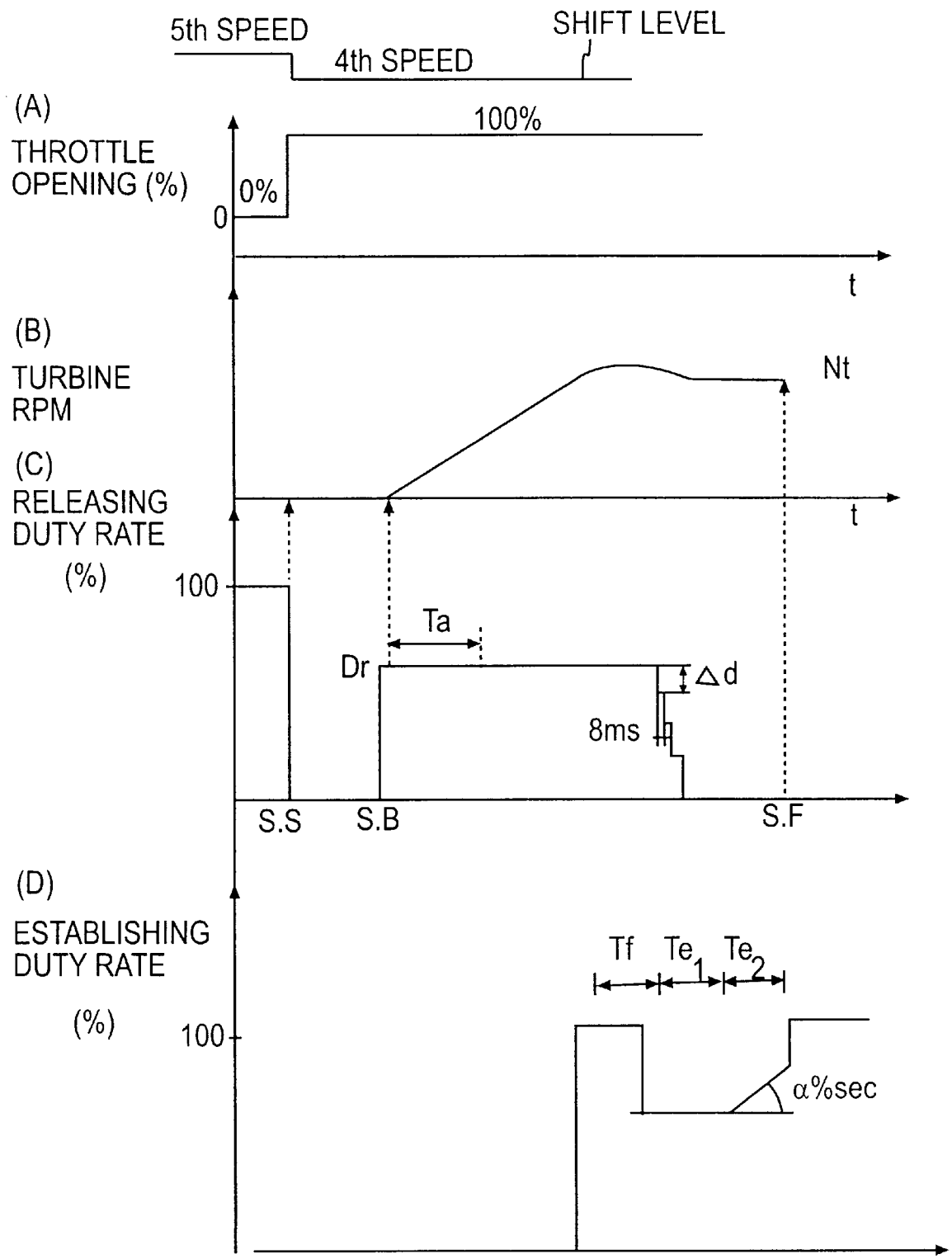
FIG. 6a is a graph showing variation in throttle opening rate during a manual shift operation according to the prior art.
FIG. 6b is a graph showing variations in turbine rpm during the prior art manual shift operation.
FIG. 6c is a graph showing variations in a duty rate of while hydraulic pressure is exhausted in the prior art manual shift operation.
FIG. 6d is a graph showing variations in the duty rate while hydraulic pressure is supplied in the prior art manual shift operation.
Figure 7:
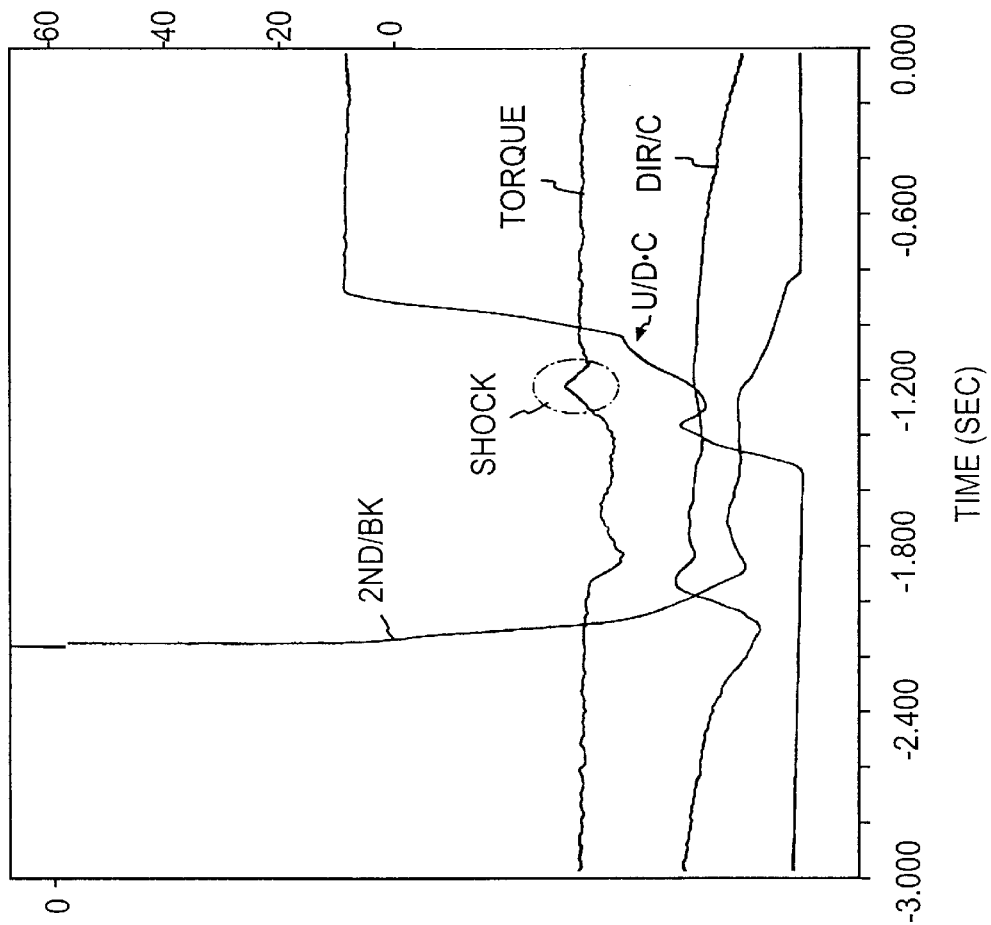
FIG. 7 is a graph showing variations in hydraulic pressures applied to friction elements during the prior art manual downshift operation.

While executing the feedback control, the TCU 20 checks if a first synchronization point is detected in step S350. If the first synchronization point is detected, the $2^{ND}$-SV 31 of the actuator 30 is duty controlled according to a duty control signal from the TCU 20 such that the line pressure applied to the second brake C1 is discharged at a rate shown by a third pressure exhaust line a3 in FIG. 5. Accordingly, downshifting is performed without the generation of shift shock as shown in FIG. 5.

Figure 1:
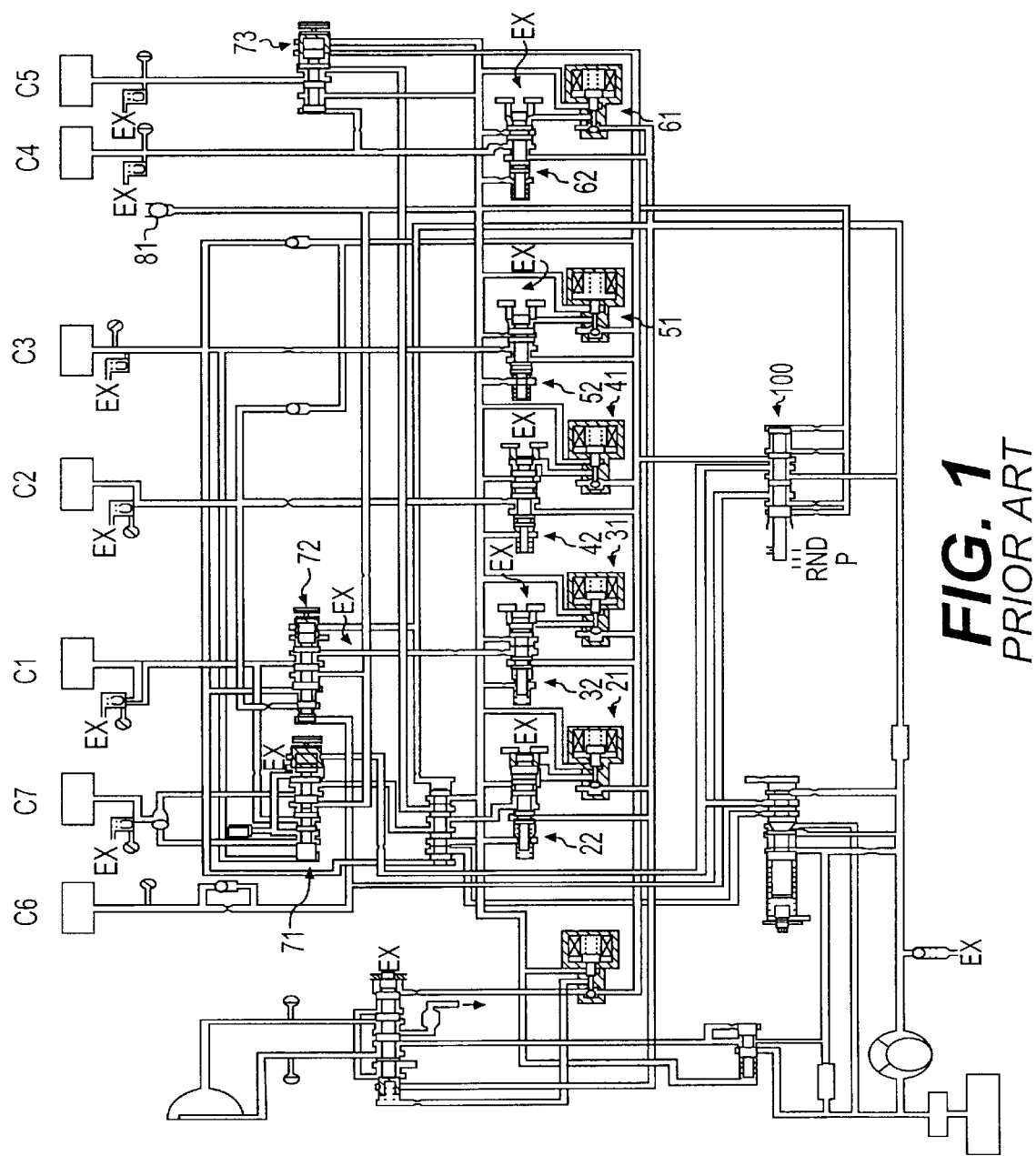
FIG. 1 is a hydraulic circuit diagram of a prior art hydraulic control system.
Figure 2:
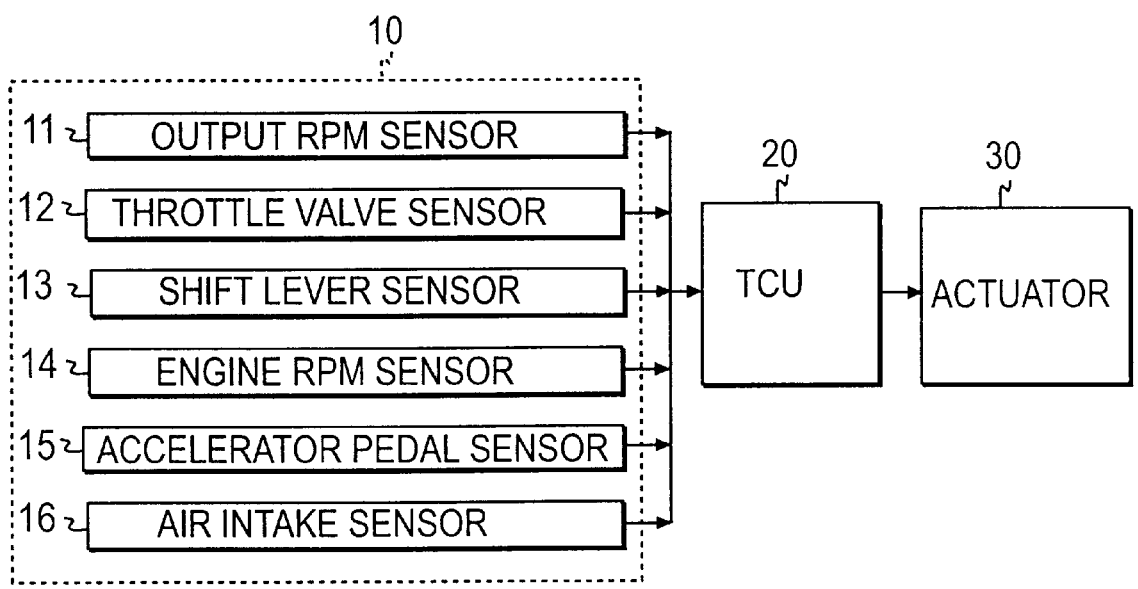
FIG. 2 is a block diagram of a prior art manual downshift control system.

At the same time, the TCU 20 produces and sends a duty control signal to a U/D-S/V 41 for establishing line pressure to an underdrive clutch C2, and maintains this state for a predetermined period of time (Tf) as shown in FIG. 4d. The U/D-S/V 41, acting as the actuator 30, is controlled by the duty control signal from the TCU 20 so as to supply line pressure to the underdrive clutch C2 at a rate shown by a first pressure supply line b1 in FIG. 5. The line pressure is applied to the underdrive clutch C2 via a M/V 100 and a U/D-PCV 42 as shown in FIG. 1.

After the predetermined period of time (Tf) has elapsed, the TCU 20 sends a duty control signal to the U/D-S/V 41 for reducing the duty ratio by as much as a predetermined amount, and maintains this state for a predetermined period of time (Te1) as shown in FIG. 4d. The U/D-S/V 41 is controlled by a duty control signal from the TCU 20 so as to supply line pressure to the underdrive clutch C2 at a rate shown by a second pressure supply line b2 in FIG. 5.

While executing the feedback control, the TCU 20 determines if a second synchronization point has been detected in step S360. If the second synchronization point is detected, the TCU 20 ends the feedback control subroutine and returns to the main processes of the inventive downshift method in step S370.

Next, the TCU 20 sends a duty control signal to the second brake C1, which acts as actuator 30, to reduce a final duty ratio (Dr) by as much as a predetermined amount Δd (step S190), and maintains this state for a period of 8 ms (step S200).

The $2^{ND}$-S/V 31 is duty controlled according to the duty control signal so as to release a line pressure applied to the second brake C1 at a rate shown by a fourth pressure exhaust line a4 as shown in FIG. 5.

Next, the TCU 20 determines if the final duty ratio (Dr) has reached 0% (step S220). If the final duty ratio is 0%, the TCU 20 ends the release duty control of the second brake C1. On the other hand, if the final duty does not reach 0%, the TCU 20 repeats the processes corresponding to steps S190~S210 until the final duty ratio reaches 0%.

Also, if the period of time (Te1) for applying a line pressure to the underdrive clutch C2 is finished, the TCU 20 sends a duty control signal for increasing the final duty ratio during a time period (Te2) at a predetermined rate of %/sec to the U/D-S/V 41.

The U/D-S/V 41 is duty controlled by a duty control signal from the TCU 20 so as to supply line pressure to the U/D(C2) at a rate shown by a third pressure supply line b3 in FIG. 5.

When the period of time (Te2) has elapsed, the TCU 20 sends a duty control signal for changing the final duty ratio into a duty ratio of 100% to the U/D-S/V 42 so as to end the duty control.

The above shift control method can be used for manual shifting by manipulating a shift lever in a manual mode and a sports mode.

As described above, in the power-on manual downshift method of the present invention, feedback control is performed using the feedback start duty ratio (Dr) which is obtained by adding the manual downshift compensation value (Drmnl) according to variations in the throttle valve opening to the equation for calculating the conventional feedback start duty ratio such that it is possible to prevent exhaust pressure and supply pressure from being applied at the same time, resulting in stabilizing engine torque input into the automatic transmission. Accordingly, shift quality and ride comfort of the vehicle are enhanced.

In this disclosure, there is shown and described only the preferred embodiment of the invention, but, as aforementioned, it is to be understood that the invention is capable of use in various other combinations and environments and is capable of changes or modification within the scope of the inventive concepts as expressed herein.

What is claimed is:

1. A power-on manual downshift control method comprising the steps of:

determining if a power-on manual downshifting operation is being performed or not when a TCU receives a power-on manual downshifting signal;

producing a duty control signal of 0% if the power-on manual downshifting operation is being performed;

determining if a shift begin point is detected or not;

compensating for a feedback start duty ratio Dr, and producing and outputting a compensated duty ratio if the shift begin point is detected;

maintaining a state in which the compensated duty ratio is output for a predetermined period of time Ta;

executing a feedback control sub-routine on ending of the predetermined period of time Ta;

reducing the duty ratio by as much as a predetermined duty amount Δd on ending of the feedback sub-routine, and maintaining this state for a predetermined period; and ending the duty control if the feed back start duty ratio reaches 0%, wherein the feedback control start duty ratio Dr is calculated in accordance with the following equation:

$$Dr = (Dr0 + Dr1 - Drkd - Drmnl) \times Ke + \Delta Dt$$

where

Dr is a feedback start duty ratio,
Dr0 is an initial standard duty ratio (fixed value stored in memory),
Dr1 is a learned compensating rate,
Ke is an engine rmp calibration factor,
$\Delta Dt$ is an oil temperature compensating duty ratio,
Drkd is an amount by which a ratio between intake air to engine rpm is less than a preset standard value, and
Drmnl is a manual downshift compensating value according to variations in throttle valve opening.

2. The power-on manual downshift control method of claim 1 wherein the manual downshift control method is used for manual shifting by manipulation of a shift lever in a manual mode and a sports mode.

* * * * *